(12) United States Patent
Brabek et al.

(10) Patent No.: US 6,314,990 B1
(45) Date of Patent: Nov. 13, 2001

(54) PRESSURE VALVE FOR A COMPRESSOR

(75) Inventors: Walter Brabek, Jennersdorf; Hans Peter Schögler, Fehring, both of (AT)

(73) Assignee: Verdichter Oe. Ges. m.b.H., Fürstenfeld (AT)

( * ) Notice: Subject to any disclaimer, the term of this patent is extended or adjusted under 35 U.S.C. 154(b) by 0 days.

(21) Appl. No.: 09/581,739

(22) PCT Filed: Nov. 27, 1998

(86) PCT No.: PCT/AT98/00289

§ 371 Date: Jun. 16, 2000

§ 102(e) Date: Jun. 16, 2000

(87) PCT Pub. No.: WO99/31387

PCT Pub. Date: Jun. 24, 1999

(30) Foreign Application Priority Data

Dec. 17, 1997 (AT) .................................................. 2134/97

(51) Int. Cl.⁷ .............................. F16K 15/16; F04B 39/14
(52) U.S. Cl. ...................... 137/454.4; 137/514; 137/856; 137/15.18; 417/571
(58) Field of Search .............................. 137/454.4, 514, 137/851, 852, 856, 15.18; 417/569, 571

(56) References Cited

U.S. PATENT DOCUMENTS

| | | | |
|---|---|---|---|
| Re. 32,651 | * 4/1988 | Romer | 137/856 |
| 3,039,487 | * 6/1962 | Doeg | 137/516.11 |
| 5,100,306 | * 3/1992 | Moran, Jr. et al. | 137/514 |
| 5,110,272 | 5/1992 | Peruzzi et al. | |
| 5,209,260 | 5/1993 | Baek | |
| 5,558,508 | * 9/1996 | Sasano et al. | 137/856 |
| 5,738,502 | * 4/1998 | Lee | 137/858 |
| 5,769,126 | * 6/1998 | Cho | 137/856 |

FOREIGN PATENT DOCUMENTS

| | | |
|---|---|---|
| 1 503 406 | 2/1970 | (DE) . |
| 33 05 791 | 8/1984 | (DE) . |
| 891313 | 3/1962 | (GB) . |
| 2 296 961 | 7/1996 | (GB) . |

\* cited by examiner

Primary Examiner—Michael Powell Buiz
Assistant Examiner—Ramesh Krishnamurthy
(74) Attorney, Agent, or Firm—Collard & Roe, P.C.

(57) ABSTRACT

A pressure valve for a compressor, in particular a hermetically encapsulated small-size refrigerating machine, comprising the following elements: a valve plate (33), a cylinder cover (40)comprising a substantially quadrangular base plate with cylinder walls formed thereon, with the valve plate (33) and the cylinder cover (40) being mutually connected by means of fastening elements, and with a seal (58) arranged in between and a valve spring (23) arranged in the volume enclosed by the valve plate (33) and the cylinder lid (40), a substantially U-shaped holding-down element (21) with pins and legs taking the squaring and, optionally, a damper element (27), with the valve spring, the damper element and the holding-down element being arranged in this sequence above the valve seat. In order to decisively reduce the amount of production work and to enable a pre-assembly of the holding-down element including the valve spring and the damper element with the valve plate it is provided that the valve plate (33) is provided with a plan arrangement and comprises bores (36), and pins (15, 16a, 16b) which correspond with the bores (36) are arranged on the holding-down element (21), with the distance of the pins (15, 16a, 16b) from one another being slightly different from the distance of the bores (36) from one another, so that during the insertion into the valve plate (33) an initial tensioning of the holding-down element occurs which ensures the holding of the elements on the valve plate.

9 Claims, 8 Drawing Sheets

PRESSURE VALVE FOR A COMPRESSOR

BACKGROUND OF THE INVENTION

1. Field of the Invention

The invention relates to a pressure valve for a compressor.

2. Description of the Prior Art

Pressure valves of this kind are disposed on the pressure side of compressors. In known pressure valves according to the state of the art, a valve spring, a damper element which is not absolutely necessary, and a holding-down element are arranged above a pressure bore of a valve plate, with one element being situated above the other. All elements are located in a volume enclosed by the valve plate and the cylinder cover, with both being fastened to the cylinder by means of screws. During the compression cycle of the compressor the valve spring opens through the pressure of the medium in the pressure bore and the spring flips upwardly. It is not necessarily braked by a damper element. The stroke of the valve spring is also not necessarily limited by a holding-down element. Once the compression cycle has been completed, the spring flips over the pressure bore again as a result of the spring power and the difference in pressure, and closes the same.

U.S. Pat. No. 5,110,272 discloses a pressure valve which comprises a valve spring, a damper element and a holding-down element comprising a pin. The serious disadvantage as compared with the pressure valve in accordance with the invention is the fact that a recess is provided in the valve plate which renders machining more difficult and that it is additionally necessary that the holding-down element must be fastened to the valve plate by means of rivets. As compared with the pressure valve in accordance with the invention this means a substantially longer production time and substantially more material that needs to be processed when considering piece numbers of several million per year.

DE 33 05 791 A1 also discloses a pressure valve for a compressor in which the valve plate comprises an oblong recess into which an insert is placed on which pins are arranged. Said pins stand normal to the plane of the valve plate and the insert. The valve spring, the damper element and the holding-down elements are provided with recesses which can be brought into engagement with said pins. As a result, these elements are fixed in their position.

The disadvantage of this type of pressure valve is the labour-intensive production. It is first necessary to mill an oblong recess into the valve plate, whereby it is necessary to ensure that the surface roughness on the valve seat does not exceed the stated tolerances. Subsequently, it is necessary to produce an insert which is inserted into the previously milled oblong recess. The volume of material that is removed first by metal cutting is then partly refilled again. The entire pressure valve further comprises an insert, a valve spring, an additional leaf spring, a catching plate as well as a bridge spring, thus five parts which entail a considerable amount of assembly work.

Pressure valves are further known whose valve plate is not provided with any recess, but where the valve spring, the damper element and the holding-down element(s) are fastened to the valve plate by means of rivets. Such a design also means additional manufacturing work, since at least one riveting machine needs to be used. Moreover, the disassembly of this arrangement for repair purposes is rendered more difficult, if not even impossible, due to the rivets. A pre-assembly of the valve plate including the valve spring, damper element and holding-down element is not possible, since they concern loosely inserted parts which does not allow any simple handling of the unit thus produced.

DE-AS 1 503 406 discloses a valve arrangement in which a stop plate and a tensioning leaf spring are arranged above a pressure-valve leaf spring. These elements are in engagement with two pins which are inserted in bores in the valve plate and the cylinder cover and thus ensure the unity of the arrangement. There are two specific disadvantages as compared with the present invention. The complex fastening of the pressure-valve leaf spring by means of the four parts instead of one part as in the present invention leads to a considerably higher amount of manufacturing work and increases the probability of the failure of the entire pressure valve. The opening valve spring is not subjected to any damping, whereas the possibility of the provision of a damper element was considered in the present application. Moreover, the pressure valve disclosed in the cited specification concerns the principle of intake compression which differs from the present application. DE-AS 1 503 406 discloses two separate suction sound boxes as well as a central pressure bore. This leads to a higher suction gas preheating, which on the other hand leads to higher work to be done on the compression.

SUMMARY OF THE INVENTION

It is the object of the present invention to provide a pressure valve which avoids the aforementioned disadvantages, allows a simple assembly of the various components and simultaneously fastens the valve spring, the damper element and the holding-down element to each other without any auxiliary means, decisively reduces the amount of production work and minimizes the failure probability.

This object is achieved with a pressure valve for compressors, which comprises an assembly of a flat valve plate having plane surfaces and defining bores passing through the valve plate between the surfaces, the bores being spaced from each other, a cylinder cover including a substantially quadrangular base plate and walls extending from the base plate to the flat valve plate, the flat valve plate and cylinder cover enclosing a chamber therebetween, a seal arranged between the flat valve plate and the cylinder cover walls, fastening elements connecting the flat valve plate to the cylinder cover walls, a valve spring arranged in the chamber above a valve seat, and a substantially U-shaped holding-down element arranged in the chamber above the valve spring for holding down the valve spring. The holding-down element has pins inserted in the bores, and the pins are spaced sufficiently differently from each other than the bores whereby the pins are held in the bores under tension.

A complete working cycle can be omitted due to the plane surface of the valve plate. The special arrangement of the pins on the holding-down element towards the corresponding bores in the valve plate allows the fixing of the holding-down element, the valve spring and the damper element to the valve plate, thus avoiding additional fastening means such as rivets and saving not only weight (material) but also reducing the production time.

If the holding-down element is comprised of two end portions having a lower bearing plane and an elevated center portion extending therebetween, the elevated center portion having an upper side facing a center part of the base plate of the cylinder cover, the distance between the bearing plane of the two end portions and the upper side of the elevated center portion being at least as large than the clearance between the bearing plane of the two end portions and the center part of the cylinder cover base plate, the holding-down element is pressed by the cylinder cover in its central region against the valve plate after the assembly in order to prevent the detachment of the holding-down element by operationally induced vibrations.

According to a preferred embodiment, the pins are arranged in the end portions of the holding-down element, and one of the end portions of the holding-down element has two prongs forming a fork shape, and the other end portion has the shape of a tongue. This prevents the wrong mounting of the holding-down element on the valve plate due to the asymmetric form. Confusion concerning the proper direction of insertion and difficulties concerning the valve spring and the damper element caused by wrong mounting can be excluded due to the fact that only one direction of insertion is possible. Moreover, the pins formed on the holding-down element enable a precise positioning of the valve spring and the damper element.

In other preferred embodiments, two of the pins are arranged on the prongs and one pin is arranged on the tongue. The one end portion comprises a tongue-shaped element extending between the prongs, the tongue-shaped element carrying an additional pin and the other end portion also carrying an additional pin. In this case, the valve spring has an end section provided with open recesses receiving the two pins and the additional pin is arranged on the one end portion of the holding-down element. Furthermore, a damper element may be arranged between the valve spring and the holding-down element, the damper element having a first bent-up end section provided with open recesses receiving the two pins and the additional pin arranged on the one end portion of the holding-down element. The damper element may also have a further bent-up end section opposite the first bent-up end section, the further bent-up end section being provided with a recess receiving the one pin arranged on the tongue. This allows a stable fastening both of the holding-down element on the valve plate as well as the valve spring and damper element on the pins of the holding-down element. Any displacement of these components after the assembly of the valve plate with the cylinder cover is thus no longer possible.

The invention is now described below in closer detail by reference to an embodiment shown in the drawings, wherein:

DETAILED DESCRIPTION OF PREFERRED EMBODIMENT

Figure 1:
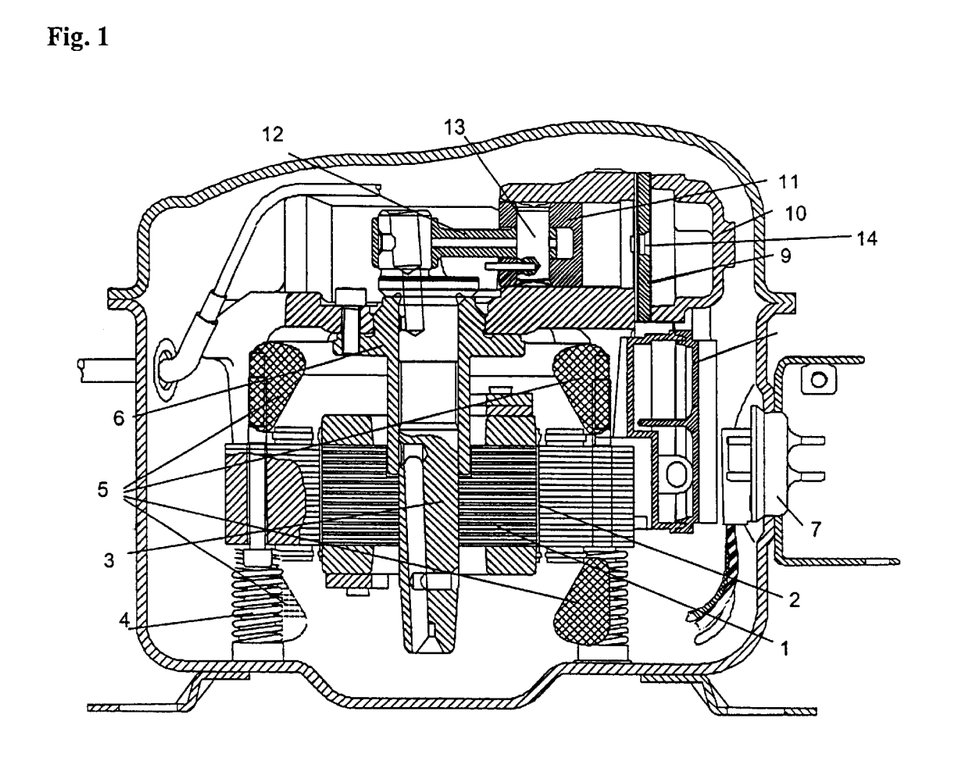
FIG. 1 shows a sectional view of a compressor in which a pressure valve in accordance with the invention is used.

FIG. 1 shows a sectional view through the compressor according to the state of the art. A crankshaft 3 is driven by way of an electromotor with rotor 1, interferric gap 2 and stator windings 5, which motor is held on compression springs 4 and is supplied with power via current lead-through 7, and which crankshaft drives a piston with a piston pin 13 via a connecting rod 12. Said piston presses the compressed medium via a pressure bore in the valve plate 9 into the space between the valve plate 9 and the cylinder cover 10 from where it is supplied to the medium circulation again via a pressure line.

Figure 2A:
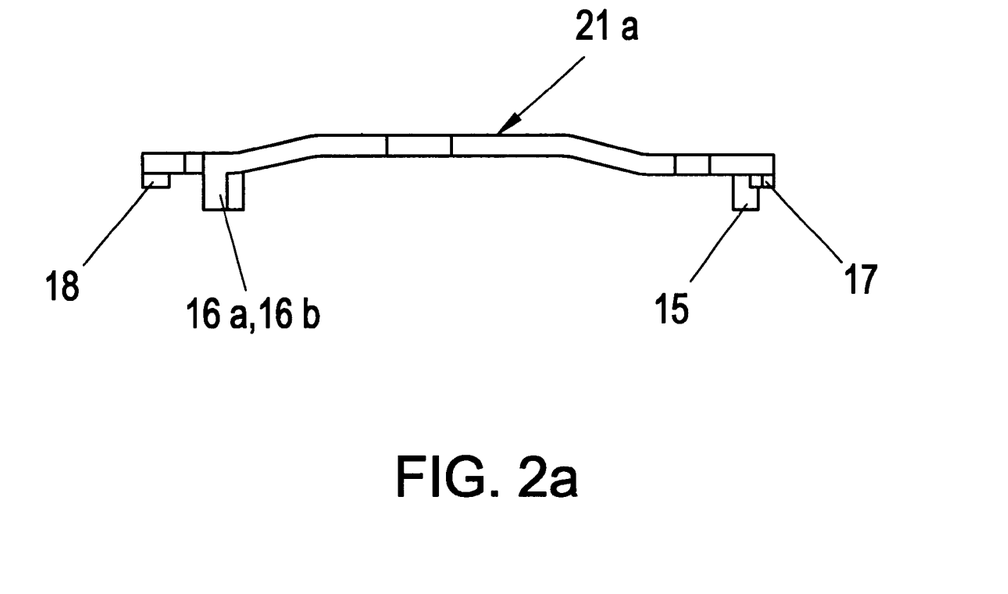
FIGS. 2a and 2b respectively show an end and a plan view of a holding-down element in accordance with the invention.
Figure 2B:
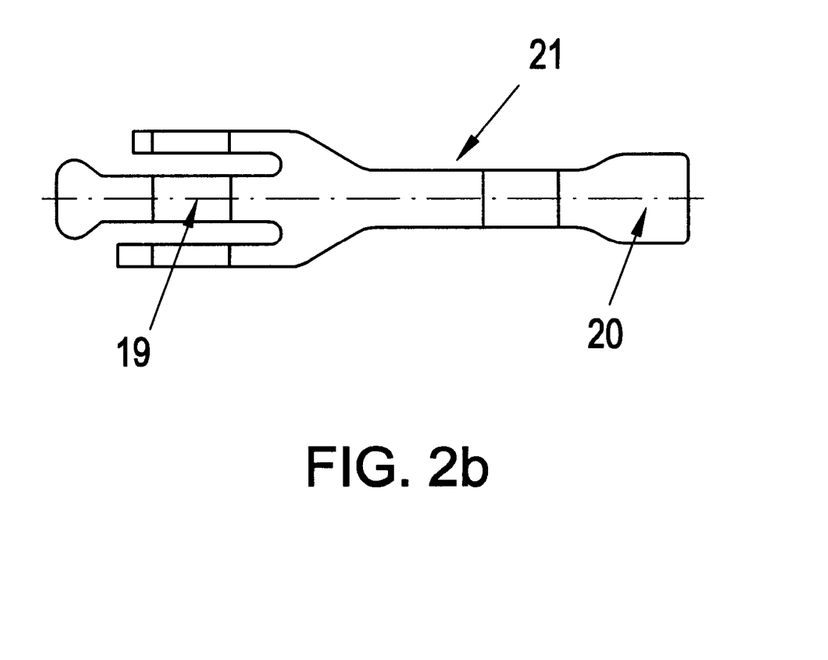

FIG. 2 shows a holding-down element 21 in accordance with the invention. An end zone 19 is arranged in the shape of a fork and the other end zone 20 in the shape of a tongue. Pins 18, 16a and 16b are arranged on the lower side of the fork-like end zone 19. Pins 15 and 17 are also arranged on the lower side of the tongue-like end zone 20. All pins stand substantially perpendicular to the plane of the holding-down element. In accordance with the invention, the distance of the pins from one another differs slightly from the distance of the bores 35 from one another in the valve plate 33 for receiving the pins. This leads to an initial tension during the insertion of the holding-down element 21 on the plane valve plate in accordance with the invention, which initial tension will ensure the holding of the elements on the valve plate even without the cylinder cover. The holding-down element is provided in the known manner with a U-shaped cross section with legs taking the squaring (end zones 19 and 20).

Figure 3:
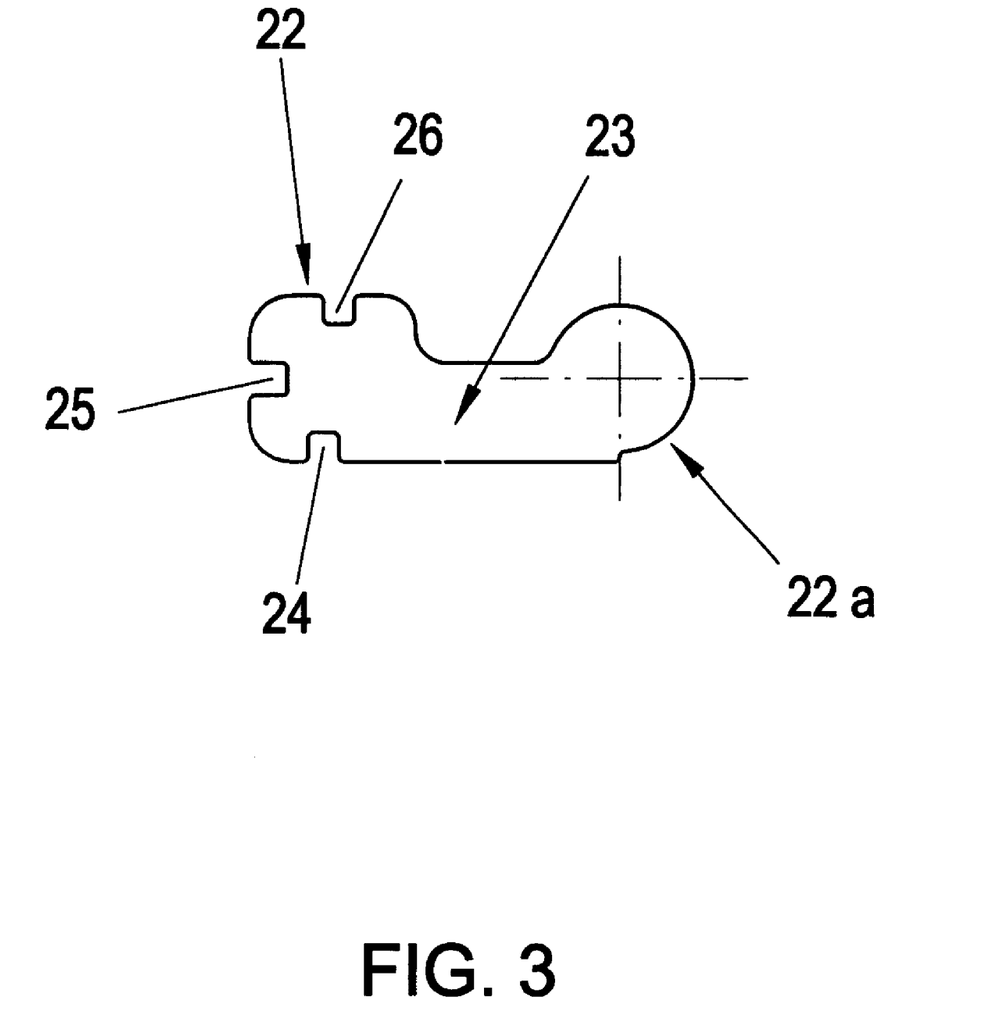
FIG. 3. shows a plan view of a valve spring.

FIG. 3 shows a valve spring 23. Recesses 24, 25, 26 are provided in the end zone 22, with the recesses 24 and 26 being arranged on the longitudinal side of the valve spring and recess 25 on the face side. The other end zone 22a is arranged in the shape of a circle.

Figure 4A:
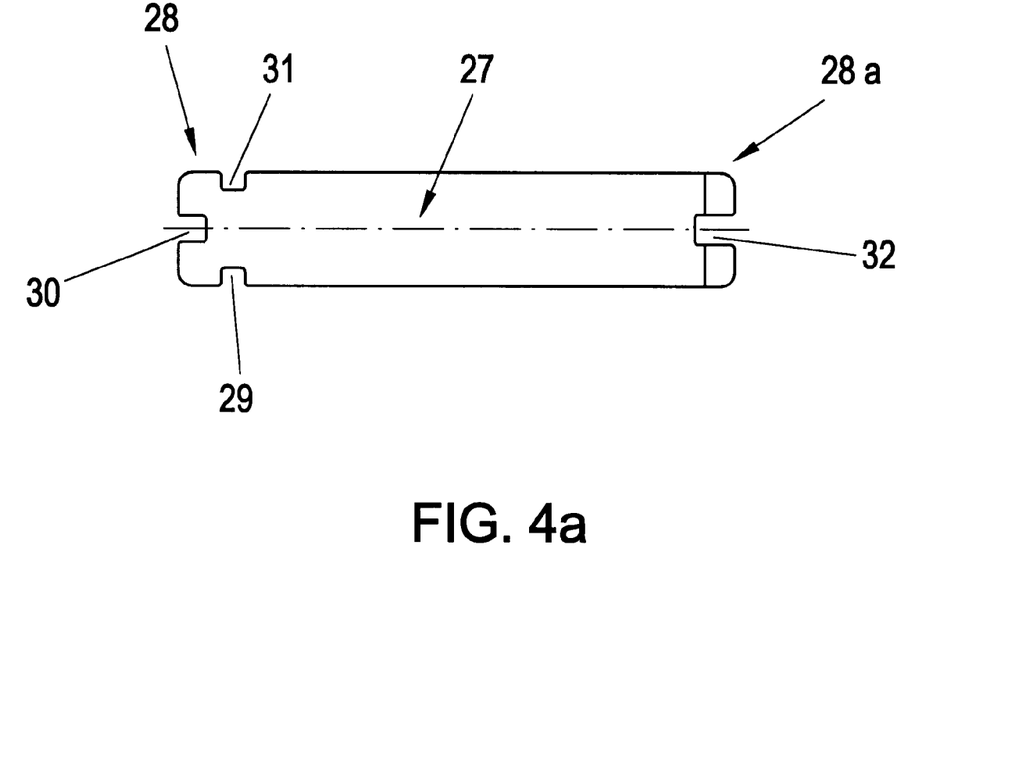
FIGS. 4a and 4b respectively show a plan view and an end view of a damper element.
Figure 4B:
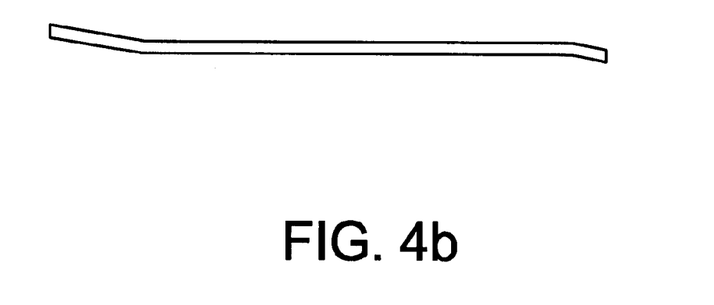

FIG. 4 shows a damper element 27 which is bent up in its end zones 28 and 28a in mutually opposite directions. Respective recesses 29, 30 and 31 are provided in the end zone 28, with the recesses 29 and 21 being arranged on the longitudinal edges of the damper element 27 and and the recess 30 on the face side. Respective recesses 29, 30 are provided at the face side in the end zone 28. A face-sided recess 32 is also arranged in the end zone 28a.

Figure 5A:
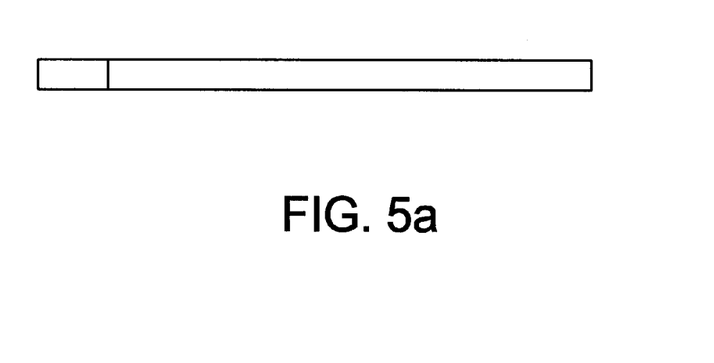
FIGS. 5a and 5b respectively show an end plan view of a valve plate in accordance with the invention.
Figure 5B:
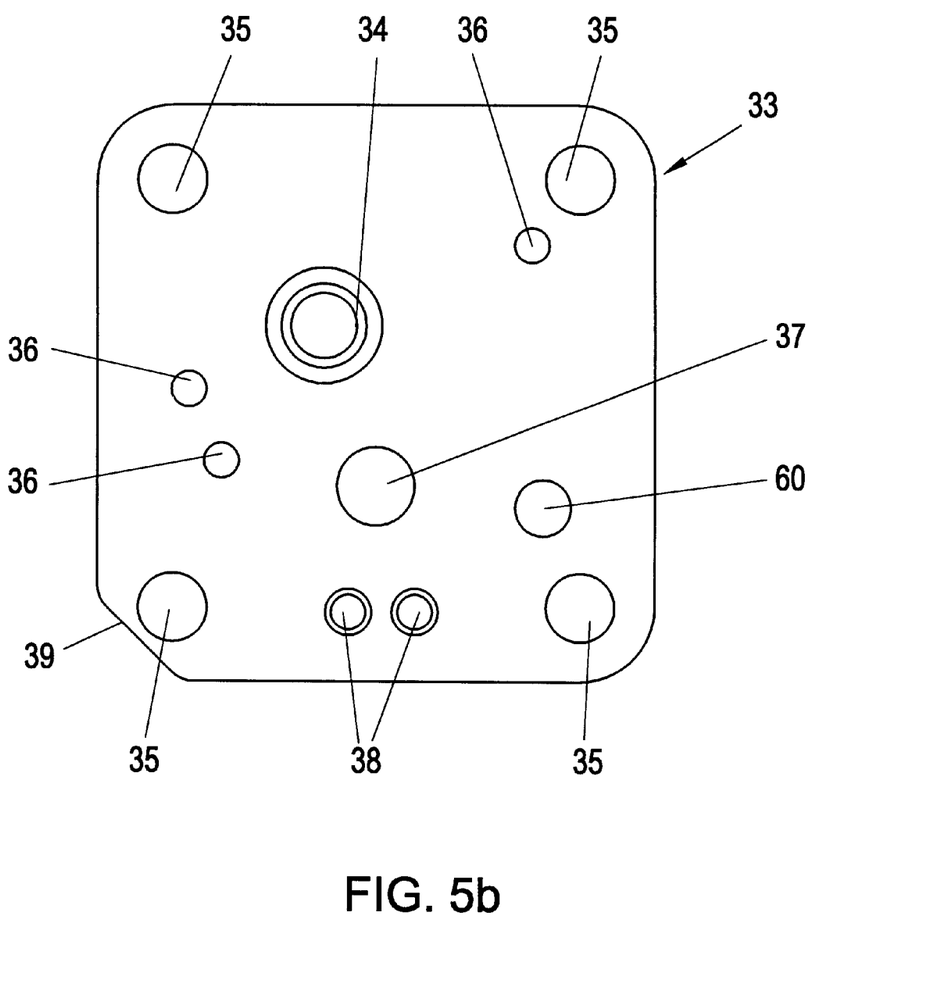

FIG. 5 shows an elevated and plan view of a substantially quadrangular valve plate 33 in accordance with the invention. A completely plane plate comprises a pressure valve opening with valve seat 34, fastening holes 35 for the connection with the cylinder cover, fastening openings 36 for the holding-down elements, a suction valve opening 37 and fastening openings 38 for the suction sound absorber. One corner 39 of the valve plate is bevelled.

Figure 6A:
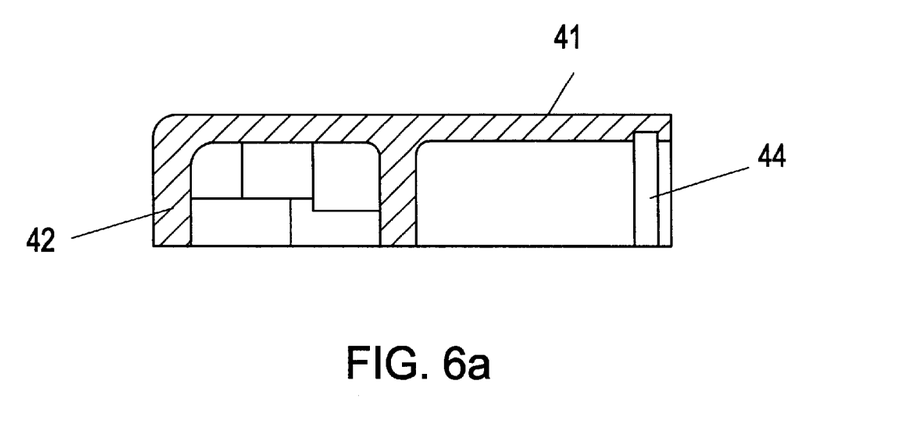
FIGS. 6a and 6b respectively show a sectional view and a plan view of a cylinder cover in accordance with the invention.
Figure 6B:
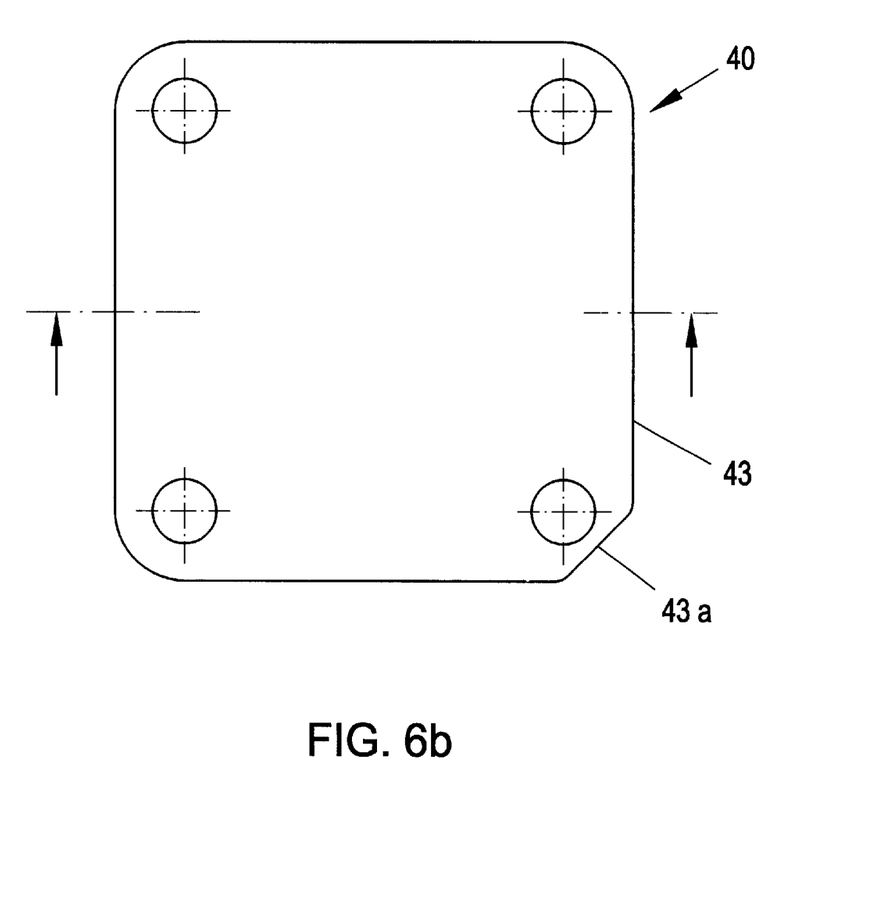
Figure 7:
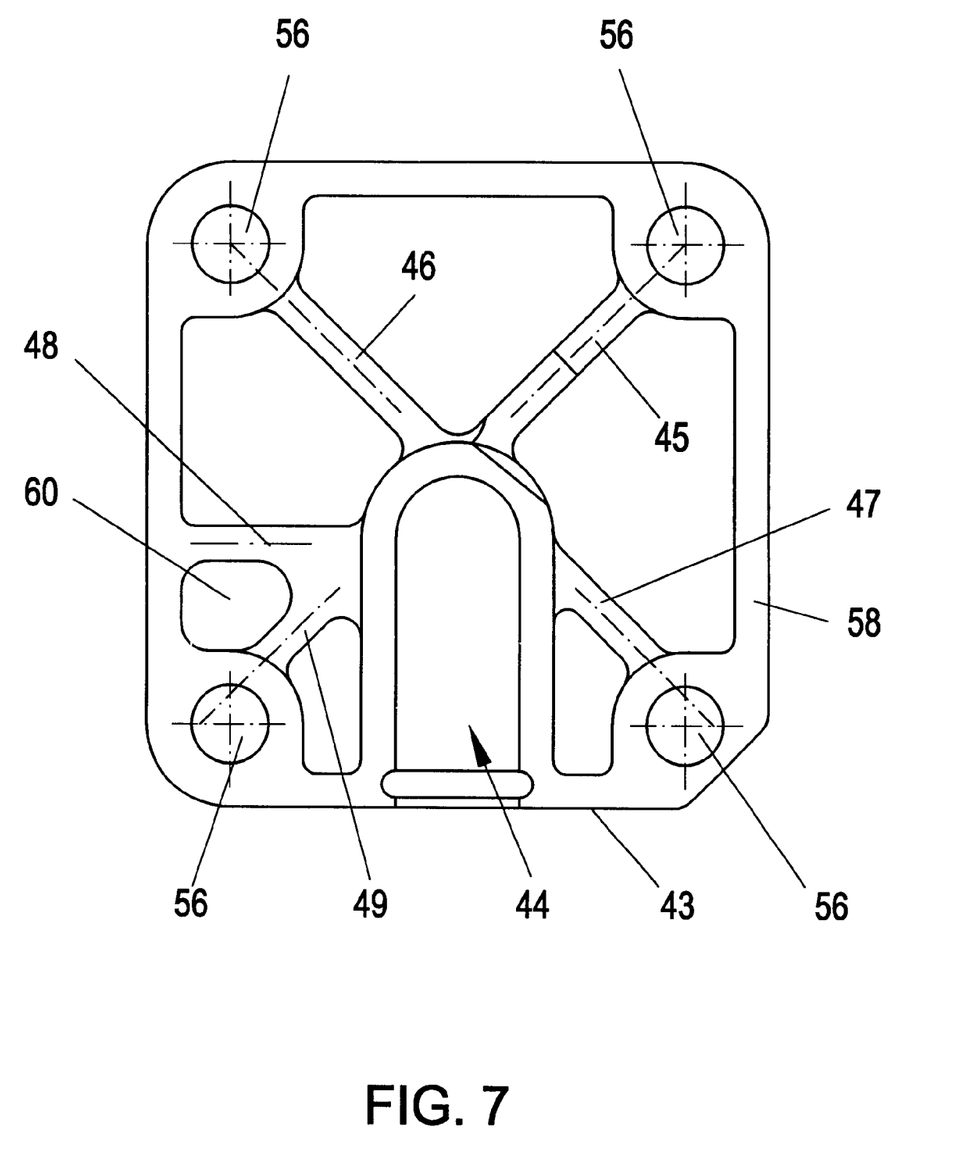
FIG. 7 shows a bottom view of a cylinder cover.

FIGS. 6 and 7 show sectional views and plan views of a cylinder cover 40 in accordance with the invention. A cylinder cover wall 42 is formed on a substantially quadrangular base plate 41, which wall is provided in the centre of one side 43 of the cylinder cover with a passage 44 through which the suction of the medium is performed. Bridges 45, 46, 47, 48, 49 are arranged on the interior side of the cylinder cover 41. A seal 58 and bores 56 for fastening the valve plate are additionally provided on the cylinder cover.

Figure 8A:
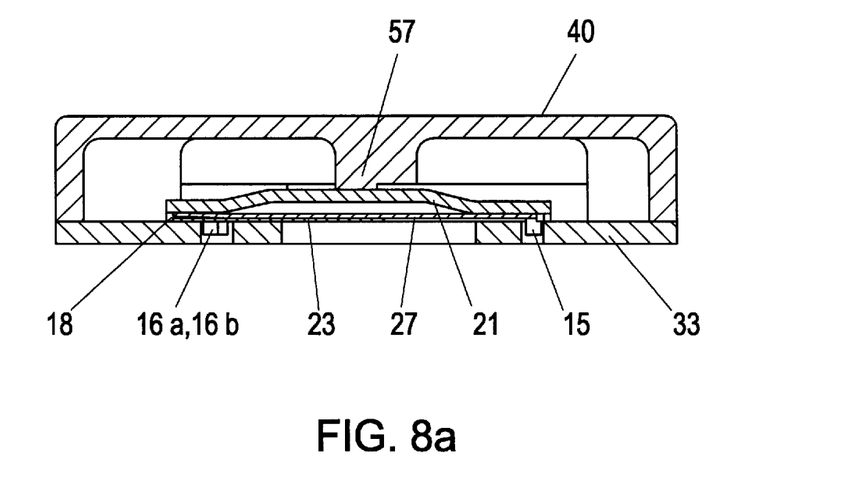
FIGS. 8a and 8b respectively show an end view and a plan view of an assembled pressure valve in accordance with the invention.
Figure 8B:
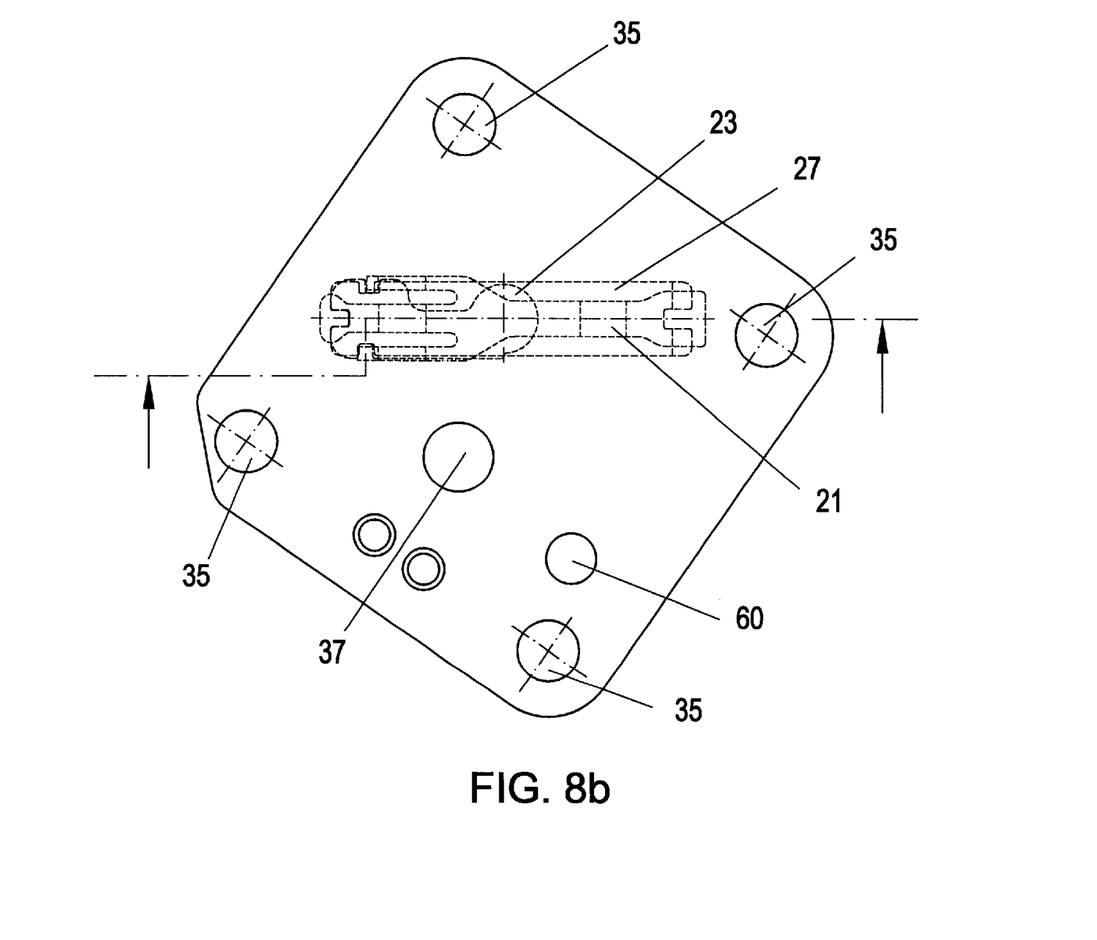

FIG. 8 shows an assembled view of a pressure valve in accordance with the invention with valve plate 33 and cylinder cover 40. The holding-down element 21 is fastened with its pins 15, 16a, 16b in the valve plate 33. The cylinder cover 40 presses with a bridge 57 against the central zone of the holding-down element, and the pressure valve spring 23 is in engagement with the pins 16a, 16b, 18 with its recesses 24, 25, 26. As a possible variant of the embodiment, the damper element 27 is also in engagement with pins 16a, 16b, 18 and 15 of the holding-down element with its recesses 29, 30, 31. Cylinder cover 40 and valve plate 33 are connected by means of screws for example. The correct alignment of the two elements is produced in such a way that the two bevelled corners 39 and 43a come to lie above one another.

A preciser description of a compression process is explained below, with the function of the pressure spring valve being described in an explanatory manner.

As soon as the medium to be compressed is sucked in via the suction tube (not shown) and the suction bore 37 of the valve plate 33, the respective piston stroke is performed in order to compress the medium. The medium to be compressed is pressed from below against the valve plate 33 and thus also against the pressure valve bore with the pressure valve seat 34. The end zone 22a of the pressure valve spring 23 bends away from the valve plate as a result of the built-up medium pressure and is optionally, but not necessarily, braked by the damper element 27 disposed above the same. The compressed medium flows into the volume enclosed by the cylinder cover 40 and leaves the same via the outlet opening 60 and is again supplied to the circulation of the medium.

What is claimed is:

1. A pressure valve for a compressor, which comprises an assembly of
   (a) a flat valve plate having plane surfaces and defining bores passing through the valve plate between the surfaces, the bores being spaced from each other,
   (b) a cylinder cover including
      (1) a substantially quadrangular base plate and
      (2) walls extending from the base plate to the flat valve plate,
      (3) the flat valve plate and cylinder cover enclosing a chamber therebetween,
   (c) a seal arranged between the flat valve plate and the cylinder cover walls,
   (d) fastening elements connecting the flat valve plate to the cylinder cover walls,
   (e) a valve spring arranged in the chamber above a valve seat, and
   (f) a substantially U-shaped holding-down element arranged in the chamber above the valve spring for holding down the valve spring, the holding-down element having
      (1) pins inserted in the bores, the pins being spaced sufficiently differently from each other than the bores whereby the pins are held in the bores under tension.

2. The pressure valve of claim 1, further comprising a damper element arranged between the valve spring and the holding-down element.

3. The pressure valve of claim 1, wherein the holding-down element is comprised of two end portions having a lower bearing plane and an elevated center portion extending therebetween, the elevated center portion having an upper side facing a center part of the base plate of the cylinder cover, the distance between the bearing plane of the two end portions and the upper side of the elevated center portion being at least as large as the clearance between the bearing plane of the two end portions and the center part of the cylinder cover base plate.

4. The pressure valve of claim 3, wherein the pins are arranged in the end portions of the holding-down element.

5. The pressure valve of claim 3, wherein one of the end portions of the holding-down element has two prongs forming a fork shape, and the other end portion has the shape of a tongue.

6. The pressure valve of claim 5, wherein two of said pins are arranged on the prongs and one of said pins is arranged on the tongue, the one end portion comprising a tongue-shaped element extending between the prongs, the tongue-shaped element carrying an additional pin and the other end portion also carrying an additional pin.

7. The pressure valve of claim 6, wherein the valve spring has an end section provided with open recesses receiving the two pins and the additional pin arranged on the one end portion of the holding-down element.

8. The pressure valve of claim 7, further comprising a damper element arranged between the valve spring and the holding-down element, the damper element having a first bent-up end section provided with open recesses receiving the two pins and the additional pin arranged on the one end portion of the holding-down element.

9. The pressure valve of claim 8, wherein the damper element has a further bent-up end section opposite the first bent-up end section, the further bent-up end section being provided with a recess receiving the one pin arranged on the tongue.

* * * * *